United States Patent [19]

Kiyama et al.

[11] 4,288,688

[45] Sep. 8, 1981

[54] TOLL ROAD TERMINAL MACHINE

[75] Inventors: Yosito Kiyama; Shinichi Tachibana, both of Kobe; Riichiro Yamashita, Kakogawa; Takeshi Horino, Yokohama, all of Japan

[73] Assignees: Mitsubishi Jukogyo Kabushiki Kaisha, Tokyo; Matsushita Tsushin Kogyo Kabushiki Kaisha, Kanagawa, both of Japan

[21] Appl. No.: 20,232

[22] Filed: Mar. 13, 1979

[30] Foreign Application Priority Data

Mar. 17, 1978 [JP] Japan .................................. 53-29957

[51] Int. Cl.[3] ...................... G07B 15/02; G06K 13/00

[52] U.S. Cl. .................................. 235/384; 235/475; 235/476

[58] Field of Search .............. 235/384, 449, 475, 486, 235/476

[56] References Cited

U.S. PATENT DOCUMENTS 3,501,622 3/1970 Weir et al. .......................... 235/384
3,519,801 7/1970 Nielsen et al. ....................... 235/476
3,801,804 4/1974 Von Glahn et al. ................ 235/449
3,874,650 4/1975 Steigerwald et al. .............. 235/475
3,958,103 5/1976 Oka et al. ........................... 235/384
3,984,660 10/1976 Oka et al. ........................... 235/384

*Primary Examiner*—Daryl W. Cook
*Attorney, Agent, or Firm*—Wenderoth, Lind & Ponack

[57] ABSTRACT

A toll road terminal machine having dual functions as a transit ticket issuing machine at an entrance gate and as a transit ticket verifying machine at an exit gate includes: a main conveyor section provided with a magnetic read/write head assembly for writing on and reading from a magnetic recording zone of a transit ticket and a printer for printing on a printing zone of the same transit ticket; the machine also includes a joining conveyor section for conveying either a transit ticket fed from a transit ticket hopper or a transit ticket inserted into an insertion port to the main conveyor section, and a separating conveyor section for conveying a transit ticket fed from said main conveyor section either to a stacker or to an ejection port.

3 Claims, 4 Drawing Figures

TOLL ROAD TERMINAL MACHINE

BACKGROUND OF THE INVENTION

The present invention relates to a toll road terminal machine that is useable as a transit ticket issuing machine when it is installed at an entrance gate of a toll road and also as a transit ticket verifying machine when it is installed at an exit gate of a toll road.

A transit ticket issuing machine to be installed at an entrance gate of a toll road operates to magnetically record or print information at the entrance gate on a transit ticket and to deliver the ticket to a toll road user; a transit ticket verifying machine to be installed at an exit gate operates to read the magnetic information on a transit ticket received from a toll road user, to magnetically record and print information at the exit gate on the transit ticket, and to accommodate the regularly processed transit ticket in a stacker. Heretofore, the transit ticket issuing machine and transit ticket verifying machine were manufactured as separate units, so that there was a disadvantage in that the storage of spare parts, maintenance of units, etc. were multiplied.

SUMMARY OF THE INVENTION

Therefore, it is one object of the present invention to provide a toll road terminal machine which can be commonly used both as a transit ticket issuing machine and as a transit ticket verifying machine, thereby simplifying in storage or parts, maintenance of units, etc.

According to one feature of the present invention, there is provided a toll road terminal machine comprising a main conveyor section provided with a magnetic head means for writing on or reading from a magnetic recording zone of a transit ticket and a printing means for printing on a printing zone of said transit ticket, a joining conveyor section for conveying a transit ticket fed from a transit ticket hopper or a transit ticket inserted into an insertion port to said main conveyor section, and a separating conveyor section for conveying a transit ticket fed from said main conveyor section either to a stacker or to an ejection port.

BRIEF DESCRIPTION OF THE DRAWINGS

The above-mentioned and other features and objects of the present invention will become more apparent by reference to the following description of the invention taken in conjunction with the accompanying drawings, in which.

DESCRIPTION OF THE PREFERRED EMBODIMENT

Figure 1:
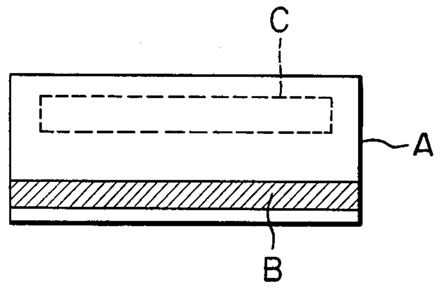
FIG. 1 is a plan view showing one example of a transit ticket.

One preferred embodiment of the toll road terminal machine according to the present invention will be described below in greater detail with reference to FIGS. 1 to 4. Referring to FIG. 1, one example of a transit ticket (an information bearing medium) is illustrated, in which reference character (A) designates a transit ticket, character (B) designates a magnetic recording zone provided at the lower portion of the transit ticket (A), and character (C) designates a printing zone (a zone where information is to be printed at an entrance gate and at an exit gate) provided at the upper portion of the same transit ticket (A).

Figure 2:
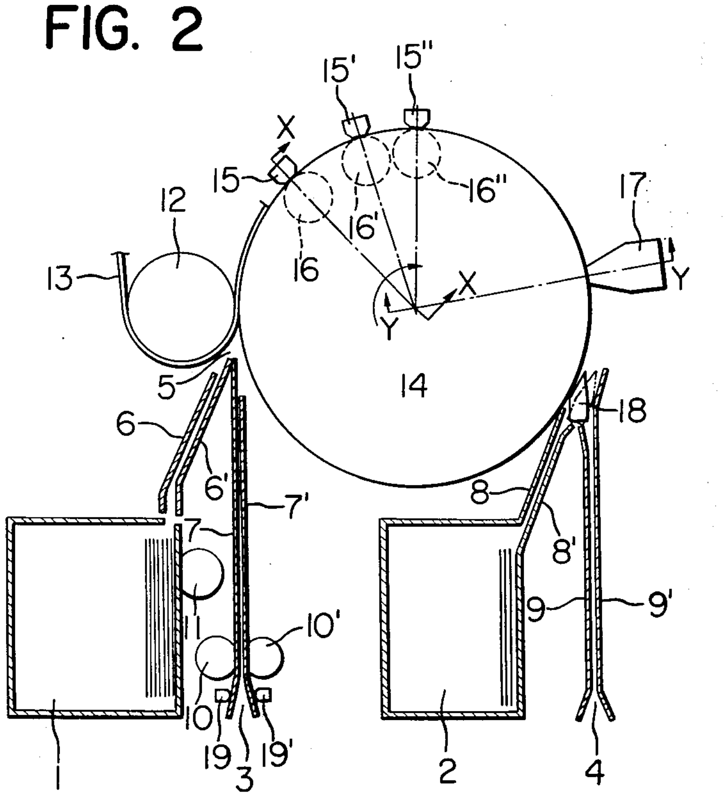
FIG. 2 is a schematic plan view partly in cross-section of one preferred embodiment a toll road terminal machine according to the present invention.

Referring to FIG. 2 which illustrates one preferred embodiment of the toll road terminal machine according to the present invention, reference number (1) designates a transit ticket hopper to be used when the terminal machine operates as a toll road issuing machine at an entrance gate; transit tickets (A) stored in the hopper (1) are adapted to be delivered one by one into a gap space between conveyor guide (6) and (6') by means of a delivery roller (11). It is to be noted that upon delivering a transit ticket (A) out of the hopper (1), well-known double-delivery inhibit means must be utilized, for example, double-delivery inhibit means having a gate disposed at the outlet of the hopper retaining a gap distance equivalent to the thickness of one transit ticket. However, for clarity, such inhibit means have been omitted from the drawings. In addition, though the conveyor guides (6) and (6') are associated with conveyor rollers, these are also omitted from illustration. Reference numeral (3) designates an insertion port for a transit ticket (A), numerals (19) and (19') designate a pair of photo-sensors for detecting the insertion of a transit ticket (A), and numerals (10) and (10') designate feed rollers adapted to be driven in response to the detection of the insertion of a transit ticket (A) by the photo-sensors (19) and (19'), the rollers delivering the inserted transit ticket (A) through a gap space between conveyor guides (7) and (7') into a joining section (5). Though the conveyor guides (7) and (7') are associated with conveyor rollers, for clarity, such rollers have been omitted from the drawings. A transit ticket (A) fed from the hopper (1) or a transit ticket (A) fed from the insertion port (3) is led via the joining section (5) to a conveyor path between a conveyor belt (13) and a conveyor drum (14). Although this conveyor belt (13) is stretched around the conveyor drum (14) so as to lead the transit ticket (A) up to the position of a flapper (18), only a part of the belt (13) is illustrated in FIG. 2. Reference numeral (12) designates a pulley serving to stretch the conveyor belt (13). The other pulleys and pulley driving means are also omitted from the drawings.

Reference numerals (15), (15') and (15'') designate read heads and a write head for reading and writing magnetic information from and onto the magnetic recording zone (B) of a transit ticket (A), numeral (15) indicating a read head, numeral (15') indicating a write head and numeral (15'') indicating another read head; numerals (16), (16') and (16'') designate pad rollers for respectively contacting under pressure their corresponding heads (15), (15') and (15''); the pad rollers serve to urge each magnetic recording zone (B) against the magnetic heads. Reference numerals (17) designates a printing head for printing on the printing zone (C) of a transit ticket (A), and, in the illustrated embodiment, the conveyor drum (14) also serves as a printing platten in conjunction with the printing head (17). Reference numeral (2) designates a stacker for accommodating transit tickets (A) conveyed through the gap space between conveyor guides (8) and (8′) with the aid of conveyor rollers (not shown); numerals (9) and (9′) designate conveyor guides cooperating with conveyor rollers (not shown) for leading a transit ticket (A) to an ejection port (4), and numeral (18) designates a flapper for separating the conveyed transit tickets (A) either to the stacker (2) or to the ejection port (4). It is to be noted that if the flapper (18) is in the illustrated solid line position, a transit ticket (A) will advance to the ejection port (4), but if the flapper (18) is in the illustrated dotted line position, a transit ticket (A) will advance to the stacker (2).

Figure 3:
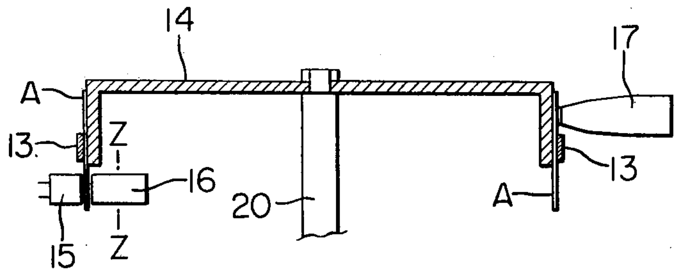
FIG. 3 shows, in its left half section, a longitudinal cross-section side view taken along line X—X in FIG. 2 as viewed in the direction of arrows, and in its right half section, a similar longitudinal cross-section side view taken along line Y—Y in FIG. 2 as viewed in the direction of arrows.

As will be best seen in FIG. 3 which shows, in its left half section, a longitudinal cross-sectional view taken along line X—X in FIG. 2 and shows in its right half section, another longitudinal cross-sectional view taken along line Y—Y in FIG. 2. A transit ticket (A) is conveyed in the direction of an arrow in FIG. 2 as pinched between the conveyor belt (13) and the conveyor drum (14). The arrangement of the magnetic head (15), pad roller (16) and printing head (17) is such that during the conveying process, the magnetic recording zone (B) of the transit ticket (A) may pass through the gap between the magnetic head (15) and the pad roller (16), both disposed under the peripheral wall of the conveyor drum (14), to effect the reading of the previously stored information, as shown in the left half section of FIG. 3. When the transit ticket (A) has come to the position of the printing head (17), the printing zone (C) of the transit ticket (A) may pass through the gap between the printing head (17) and the conveyor drum (14) to effect printing of information, as shown in the right half section of FIG. 3.

Figure 4:
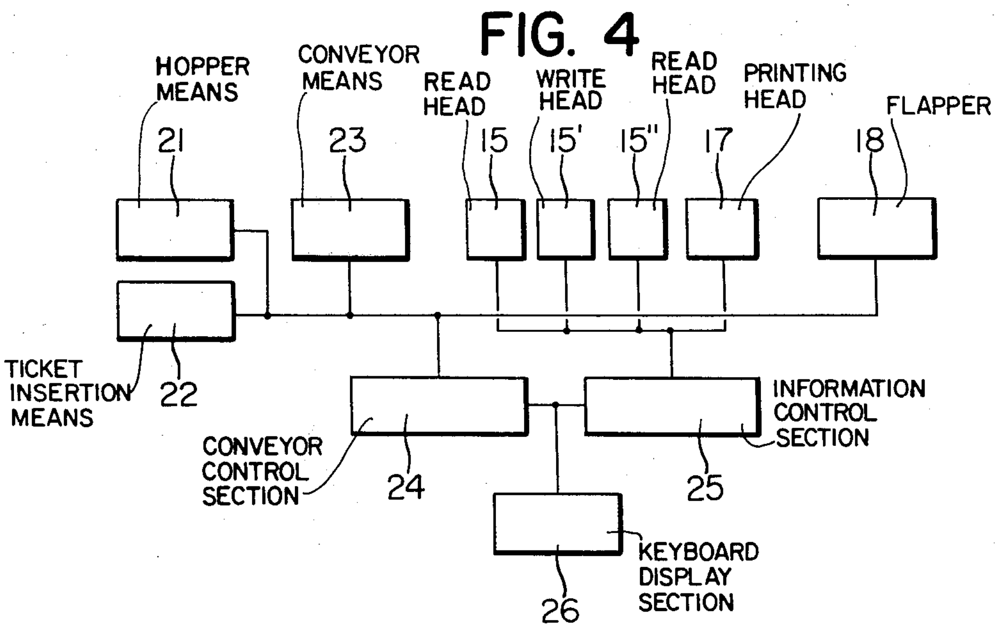
FIG. 4 is a schematic system diagram of a control circuit associated with the toll road terminal machine shown in FIG. 2.

A control system for the above-described toll road terminal machine is described below with reference to FIG. 4. In this figure, reference numeral (21) designates hopper means including the hopper (1) and the delivery roller (11), numeral (22) designates transit ticket insertion means including the insertion port (3), the feed rollers (10) and (10′) and the photo-sensors (19) and (19′), numeral (23) designates conveyor means including the pulley (12), the conveyor belt (13), the conveyor drum (14), conveyor roller (not shown), card position detecting sensors (not shown), belt driving pulleys (not shown), a motor (not shown), etc., and numeral (24) designates a conveyor control section for principally controlling the conveyor system, which is adapted to control the operation of the hopper means (21), the transit ticket insertion means (22), the conveyor means (23) and the flapper (18). In addition, numeral (25) designates an information control section for principally controlling the magnetic recording and print recording on a transit ticket (A), the information control section (25) being connected to the conveyor control section (24). Reference numeral (26) designates a keyboard display section forming a man-machine. interface with respect to an operator, the keyboard display section (26) being connected to both the conveyor control section (24) and the information control section (25). The keyboard display section (26) includes function keys for designating a type of car, keys for designating a specific processing operation, ten keys for data entry, etc. Displays on the keyboard display section (26) are provided for the display of the toll amount, the display of data inputted by the ten data entry keys, the display of an error, etc.

The following is a description of the operation of the above described toll road terminal machine. In the case where the machine is used as a transit ticket issuing machine at an entrance gate, a ticket issuance command is sent, in response to the setting of the type of car by an operator from the keyboard display section (26) to the hopper control section (24), so that one transit ticket (A) is delivered from the hopper (1). When the magnetic recording zone (B) of the delivered transit ticket (A) passes through the gap between the read head (15) and the pad roller (16) there is a verification that the delivered transit ticket (A) is not a used ticket; when the magnetic zone (B) passes through the gap between the write head (15′) and the pad roller (16′), an entrance toll gate number, the type of car, and other data are magnetically written on the magnetic recording zone (B); and when the magnetic recording zone (B) passes through the gap between the read head (15″) and the pad roller (16″), the above-mentioned written magnetic information is checked. At this time, if the magnetic information has been properly recorded, information is printed on the printing zone (C) of the transit ticket (A) by means of the printing head (17); the transit ticket (A) is then passed through the gap between the flapper (18) and the conveyor guide (9′) and then through the gap between the conveyor guides (9) and (9′), and is ejected from the ejection port (4). However, if there exists any error in the recording of the magnetic information, then, after the occurrence of an error has been printed on the printing zone (C) by means of the printing head (17), the transit ticket (A) is passed through the gap between the flapper (18) and the conveyor guide (8) and then through the gap between the conveyor guides (8) and (8′), and is stored in the stacker (2). The control of the writing, reading and read-after-write checking of the magnetic recording and the printing is carried out by the information control section (25) in response to the input signal at the keyboard display section (26) and the transit ticket position signals fed from the conveyor control section (24). In the case where an anomaly is found as a result of the checking operation, the error information is sent via the conveyor control section (24) to the flapper (18), so that the flapper (18) is displaced to the dotted-line position, thereby preventing the issuance of an improperly recorded ticket.

On the other hand, in the case where the machine is used as a transit ticket verifying maching at an exit toll gate, in response to the sensing by the photo-sensors (19) and (19′) of the insertion of a transit ticket (A) by an operator into the insertion port (3), the conveyor control section (24) drives the feed rollers (10) and (10′) to start the conveyance of the inserted transit ticket (A). When the magnetic recording zone (B) of the transit ticket (A) passed through the gap between the read head (15) and the pad roller (16), the information recorded on the magnetic recording zone (B) is read out. At this time, if the transit ticket information can be properly read out, then the information control section (25) calculates the amount of the toll on the basis of the read out data including the type of car, the entrance toll gate, etc. and the toll amount is displayed on the keyboard display section (26). However, if the transit ticket information is not properly read out, then the information control section (25) causes the keyboard display section (26) to display the reading failure. In addition, when the magnetic recording zone (B) of the transit ticket (A) passes through the gap between the write head (15′) and the pad roller (16′), the exit gate information is written on the magnetic recording zone (B); when the printing zone (C) passes through the gap between the printing head (17) and the conveyor drum (14), information is printed on the printing zone (C). A normally processed transit ticket (A) is passed through the gap between the flapper (18) and the conveyor guide (8) and then through the gap between the conveyor guides (8) and (8') and is stored in the stacker (2). However, a transit ticket (A) which has been not processed regularly is passed through the gap between the flapper (18) and the conveyor guide (9') and then through the gap between the conveyor guides (9) and (9') and is ejected from the ejection port (4). In the latter occurrence, an operator verifies the items printed on the printing zone (C) by visual inspection.

As described above, since the toll road terminal machine according to the present invention can operate as a transit ticket issuing machine if it is installed at an entrance gate and also can operate as a transit ticket verifying machine if it is installed at an exit gate, the machine can be commonly used as a transit ticket issuing machine and as a transit ticket verifying machine, so that according to the present invention, storage of spare parts, maintenance of units, etc. can be simplified.

While the present invention has been described above in connection with its preferred embodiment, the invention is not limited to the illustrated embodiment, but various changes in design could be made without departing from the spirit of the invention .

What is claimed is:

1. A toll road machine for issuing transit tickets when used at an entrance gate and for verifying transit tickets when used as an exit gate, each of said transit tickets having a magnetic recording zone adapted for writing information thereon and for reading out information therefrom, and having a printing zone adapted for printing information thereon; said machine comprising:

a transit ticket hopper for storing a plurality of unused transit tickets;

an insertion port for manually inserting a transit ticket having a previously recorded magnetic recording zone;

a joining conveyor section and a main conveyor section, and joining conveyor section for conveying either one of said plurality of transit tickets stored in said transit ticket hopper or said transit ticket inserted into said insertion port to said main conveyor section, said main conveyor section comprising a magnetic head means for writing information on the magnetic recording zone of said transit ticket conveyed thereto and for reading information from the magnetic recording zone of said transit ticket conveyed thereto and comprising printing means for printing information on the printing zone of said transit ticket conveyed thereto;

a stacker means for storing transit tickets;

an ejection port for ejecting transit tickets;

a separating conveyor section connected to said main conveyor section for conveying transit tickets from said main conveyor section to either said stacker means or to said ejection port;

a conveyor control means and an information control means, operatively electrically connected to each other and to said main and separating conveyor sections, and a manual input means operatively electrically connected to said conveyor control and information control means;

wherein when said machine is used as an entrance gate, said machine issues one of said plurality of transit tickets stored in said transit ticket hopper by ejection through said ejection port subsequent to the writing of information on the magnetic recording zone and the printing of information on the printing zone thereof by said main conveyor section in conjunction with said conveyor control and information control means; and wherein when said machine is used as an exit gate, said machine verifies a transit ticket manually inserted in said insertion port by reading the information written on the magnetic recording zone thereof by said main conveyor section in conjunction with said conveyor control and information control means and then stores said inserted transit ticket in said stacker means.

2. A machine as claimed in claim 1, wherein when said machine is used as an entrance gate, said machine prior to the issuance of one of said plurality of tickets, verifies the information written by said main conveyor section on the magnetic recording zone of said ticket conveyed from said hopper and enables the ejection of said verified ticket only if the information written on the magnetic recording zone thereof corresponds to predetermined information.

3. A machine as claimed in claim 2, wherein said manual input means comprises a keyboard means for manually inputting said predetermined information to said machine.

* * * * *